> # 2,960,464
> Patented Nov. 15, 1960

2,960,464
DRILLING FLUID

Walter J. Weiss, Sugar Land, and Richard H. Graves, Bellaire, Tex., assignors to Texaco Inc., a corporation of Delaware No Drawing. Filed July 8, 1957, Ser. No. 670,358

7 Claims. (Cl. 252—8.5)

This invention relates to the drilling of wells through subsurface formations while employing aqueous drilling fluids. More particularly, this invention relates to a drilling operation, such as a rotary drilling operation, which involves the circulation of a drilling fluid through the well bore and about the drilling bit, an improved drilling fluid and a drilling fluid additive suitable for the preparation of said drilling fluid. In a rotary drilling operation a drilling fluid is pumped down the drill stem to the drilling bit at the bottom of the bore hole. A stream of drilling fluid then passes through the drilling bit and moves upwardly through the annular space between the drill stem and the well bore wall, carrying with it the drilling cuttings.

In some areas, such as in the area of the Gulf Coast of Texas and Louisiana, formations known as heaving or sloughing shales are penetrated during a well drilling operation. The penetration of these formations while employing conventional aqueous or water base drilling fluids has been difficult due to the mud-making characteristics or properties of heaving shales. These shales have a tendency to distintegrate by swelling or cracking upon contact with water with the result that the walls of the bore hole become unstable or incompetent. In some instances the resulting sloughing or moving of the walls of the bore hole results in a stuck drill stem. In other instances the heaving shale material swells and sloughs or caves into the bore hole with a resulting enlargement of the bore hole and the formation of a large subterranean cavity.

In addition to the above-indicated difficulty of maintaining a true bore hole when drilling through heaving shale material with a conventional water base mud, the resulting finely dispersed heaving shale material is taken up into the drilling fluid. Because of the mud-making properties of heaving shale the viscosity characteristics of the drilling fluid is adversely affected. Upon the continued accumulation of these finely divided heaving shale particles in the drilling fluid the viscosity of the drilling fluid usually excessively increases with the result that the drilling fluid must be thinned by the addition of costly chemicals thereto or by dilution with water. If the drilling fluid is thinned by water dilution the addition of more weighting material, such as barium sulfate (barytes), iron oxide, lead sulfide (galena) and the like, is necessary to maintain a given mud weight.

Special drilling fluids or muds have been developed for drilling through heaving shale formations. One such drilling fluid which has been employed for drilling through heaving shale formations is a drilling fluid containing aqueous sodium silicate. Another drilling fluid which has been proposed for use during a drilling operation while drilling through less seriously dispersing or heaving shale formations is a high pH lime base drilling fluid. A high pH lime base drilling fluid, however, cannot be employed without considerably difficulty while drilling through the more seriously heaving shale formations. This mud also suffers from inadequate high temperature gelation properties, i.e., this mud tends to set up to a hard, almost rock-like material when exposed to relatively high temperatures, e.g., greater than 300° F.

There has recently been developed a superior drilling fluid or drilling mud and drilling fluid reagent admixture therefor for drilling through heaving shale formations. This drilling fluid can be briefly described as an aqueous (water base or oil-in-water emulsion) drilling fluid wherein the aqueous phase is saturated with respect to calcium hydroxide and possesses a relatively high pH, usually in the range 10–12.6, and a relatively high dissolved calcium content, at least about 200 parts per million by weight calcium. This drilling fluid is more specifically described in copending coassigned patent application Serial No. 596,456, now U.S. Patent 2,802,783 filed July 9, 1956 in the name of Walter J. Weiss and Wilbur L. Hall, which is a continuation-in-part application of patent application Serial No. 484,307 filed January 26, 1955, same inventors, now abandoned. The disclosures of the above-referred patent applications are herein incorporated and made part of this disclosure. In the drilling fluids described in the above-identified patent applications the desired dissolved calcium ion concentration is achieved by incorporating in or adding to the alkaline aqueous phase of the drilling mud a water soluble calcium salt, such as calcium chloride, calcium sulfate, calcium acetate and the like in an amount sufficient to yield in the resulting drilling fluid a dissolved calcium content of at least about 200 p.p.m.

It is an object of this invention to provide an improved drilling fluid particularly suitable for drilling through troublesome shale formations of the heaving, sloughing or rapidly dispersing type.

It is another object of this invention to provide a drilling reagent material suitable for the preparation and/or maintenance of a drilling fluid characterized by a relatively high pH and a relatively high dissolved calcium content.

Another object of this invention is to provide a drilling fluid additive material or reagent admixture useful in the preparation of a drilling fluid of the type described herein.

These and other objects of this invention and how they are accomplished will become more apparent in the light of the accompanying disclosure. In at least one embodiment of this invention at least one of the foregoing objects will be achieved.

In accordance with this invention we have provided an aqueous drilling fluid or mud particularly suitable for drilling through heaving shale. More particularly, we have determined that an aqueous drilling fluid or mud, of the type described in the above-referred patent application Serial No. 596,456, now Patent No. 2,802,783, comprising an alkaline aqueous phase substantially saturated with respect to calcium hydroxide and containing a relatively high dissolved calcium content, that is, a dissolved calcium content above about 200 parts per million by weight, can be obtained by generating the calcium ion or dissolved calcium in situ within the aqueous drilling fluid, i.e., a water soluble calcium salt or electrolyte such as calcium chloride need not be employed in the preparation of this drilling fluid. We have provided an aqueous drilling fluid characterized by an alkaline aqueous phase having a relatively high calcium ion concentration in excess of 200 p.p.m., usually in the range 400–1000 p.p.m., by incorporating in the aqueous drilling fluid materials which generate in situ the desired high calcium ion content. Still more particularly, we have discovered that satisfactory drilling muds characterized by a relatively high dissolved calcium content may be prepared by adding to the aqueous drilling mud lime and a water soluble ammonium salt. When lime (calcium hydroxide) and an ionizable water soluble ammonium salt are dissolved in an aqueous phase there results by metathetical reaction the formation of ammonium hydroxide and the corresponding calcium salt. Water soluble ammonium salts suitable in the practice of this invention include ammonium chloride, ammonium sulfate, ammonium acetate, ammonium nitrate, ammonium formate and the like. Particularly satisfactory and desirable in the practice of this invention is ammonium lignosulfonate which by metathetical reaction with lime yields ammonium hydroxide and the corresponding calcium lignosulfonate. Ammonium lignosulfonate is particularly useful in the practice of this invention since ammonium lignosulfonate is not only useful per se as a clay dispersing agent but its corresponding calcium salt, namely calcium lignosulfonate, is also a satisfactory and desirable clay dispersing agent in the subject drilling fluids.

An aqueous drilling fluid in accordance with this invention contains a hydrated drilling clay such as a bentonitic clay, e.g., Wyoming bentonite, dispersed in the aqueous phase thereof and an in situ generated water soluble calcium salt such as calcium chloride, as well as an alkalinity agent such as lime and a clay dispersing agent such as a suitable lignosulfonate, e.g., ammonium lignosulfonate, calcium lignosulfonate, etc. When an admixture of lime (calcium hydroxide) and ammonium lignosulfonate is added to the aqueous phase of a drilling mud there is produced ammonium hydroxide and the corresponding calcium lignosulfonate which upon dissolution yield dissolved calcium, thereby increasing the dissolved calcium content of the aqueous phase. It is pointed out that the metathetical reaction between lime and ammonium lignosulfonate tends to go to completion due to formation of ammonium hydroxide and resulting loss of ammonia.

Still in accordance with this invention we have provided an improved drilling fluid reagent admixture suitable for the preparation of a drilling fluid in accordance with the practice of this invention. This particular drilling fluid reagent admixture preferably comprises lime and an ammonium lignosulfonate. If desired, a three component drilling fluid reagent admixture may be employed, such as an admixture of a water soluble ammonium salt, such as ammonium chloride, lime and a suitable clay dispersing agent, such as calcium lignosulfonate, ammonium lignosulfonate and the like.

A drilling fluid in accordance with the practice of this invention may be prepared in the first instance by the addition of the drilling fluid reagent admixture to water or to water-containing hydratable drilling clay material dispersed therein. There may also be present in the drilling fluid the usual drilling mud additives (water loss additive, weighting material, emulsifying agent and the like); or, if desired, a conventional aqueous drilling fluid may be converted (broken over) to a drilling fluid in accordance with this invention by the addition thereto of the reagent admixture disclosed herein or by the separate addition of the various components making up the reagent admixture.

In the breaking over of a conventional aqueous drilling mud (water base or oil-in-water emulsion mud) to a drilling fluid in accordance with this invention a water-containing or water base drilling fluid containing dispersed hydrated drilling clay material therein is preferably thinned in order to reduce the viscosity of the drilling fluid so that when the calcium ion concentration within the aqueous phase of the drilling mud increases excessive thickening of the drilling fluid does not occur. It has been found that thinning of a clay-water drilling fluid to a value between 20–30 centipoises as measured at 600 r.p.m. by the Stormer viscosimeter prior to increasing the dissolved calcium therein usually permits a satisfactory substantially trouble-free conversion. The in situ generation of the dissolved calcium is effected by adding to the drilling fluid undergoing conversion a reagent admixture in accordance with this invention containing lime and ammonium lignosulfonate or a reagent admixture still in accordance with this invention containing lime, a suitable clay dispersing agent such as calcium lignosulfonate, ammonium lignosulfonate and the like and an ionizable water soluble ammonium salt such as ammonium chloride. After the drilling mud has been satisfactorily converted the conventional drilling mud additives, such as may be required to control or reduce water loss or to control mud weight, if not already present, can be added as required.

Suitable clay dispersing agents which may be employed in the practice of this invention include calcium lignosulfonate, sodium lignosulfonate, the heavy metal lignosulfonates such as a ferro-chrome lignosulfonate sold under the trade name Q–Broxin. Other clay dispersing agents which are satisfactory in the practice of this invention include a predominantly sodium salt of a polymeric, polyphenol derivative, apparently obtained as an extract of hemlock bark and sold under the trade name Rayflo.

A typical unweighted drilling mud prepared in accordance with this invention and containing 7½ lbs. per barrel of drilling mud, a reagent admixture containing lime (calcium hydroxide) and a clay dispersing agent, namely, an ammonium lignosulfonate sold under the trade name Orzan A, in the weight ratio 3.5:4, respectively, exhibits the following properties:

Mud weight—about 10 lbs. per gallon.
Mud solids—about 20% by weight.
$P_m$—10.0.
$P_f$—2.4.
Calcium ion concentration (aqueous phase)—1000 p.p.m.
Chloride ion (aqueous phase)—about 5300 p.p.m.

Base mud employed was a West Cote Blanche Bay mud.

$P_f$ is defined as number of cc. of $N/50$ $H_2SO_4$ required to titrate 1 cc. of aqueous phase (filtrate) of drilling fluid to a phenolphthalein end point and is a measure of the soluble hydroxyl ion content.
$P_m$ is defined as number of cc. of $N/50$ $H_2SO_4$ required to titrate 1 cc. of the whole mud.

The preferred combination calcium ion solubilizing agent and clay dispersing agent in the practice of this invention is an ammonium lignosulfonate available under the trade name Orzan A and Orzan AH. The ammonium lignosulfonates are derived from the digestion of wood pulp employing ammonium bisulfite. After extraction the sulfite liquor is concentrated and spray dried to yield a crude ammonium lignosulfonate material. The physical properties of Orzan A and the various grades of Orzan AH are set forth in accompanying Table I. Orzan AH is modified Orzan A. In the modification process a partial polymerization of the lignin sulfonate units occurs with a resulting increase in molecular weight. Ammonia takes part in the complex reactions and some of the nitrogen becomes bound, so that it is no longer alkali displaceable.

Table I

| Physical Properties | Orzan | | | | |
| --- | --- | --- | --- | --- | --- |
| | A | AH-0 | AH-1 | AH-2 | AH-3 |
| Color | Light Brown. | Brown→ | Darker→ | Darker→ | Darker. |
| Bulk density | 29.2 lb/cu. ft. | 14 to 16 pounds per cu. ft. | | | |
| pH—30% solids | 4.3 | 3.2 | 2.5 | 2.4 | 2.2 |
| Moisture—Percent | 4.5 | 1 to 2 percent | | | |
| Chemical Composition: | | | | | |
| Nitrogen [1] percent | 3.7 | 3.4 | 3.4 | 3.5 | 3.5 |
| Displaceable nitrogen do | 2.7 | 2.1 | 2.1 | 2.0 | 1.9 |
| Fixed nitrogen (by difference) percent | 1.0 | 1.3 | 1.3 | 1.5 | 1.6 |
| Lignin sulfonic acid [2] percent | 63.1 | 63.4 | 63.6 | 64.0 | 65.0 |
| Sugars (as glucose) [3] percent | 15.5 | 12.0 | 9.5 | 8.8 | 8.3 |
| Carbon percent | 45.6 | 43.8 | 43.9 | 46.2 | 46.5 |
| Hydrogen do | 5.6 | 6.2 | 6.0 | 5.8 | 5.6 |
| Sulfur do | 6.4 | 6.1 | 6.2 | 6.3 | 6.4 |

[1] Quantitative Analysis of Organic Compounds, Ralph L. Shriner, Indiana University Press (1944).
[2] TAPPI Standards, T629 m53.
[3] Analytical Chemistry, 26, 585–6 (1954).

A two component reagent admixture suitable for the preparation of a drilling fluid in accordance with this invention would comprise lime and ammonium lignosulfonate in the weight ratio range 0.5–5.0:0.5–5.0, respectively. In such a reagent admixture the ammonium lignosulfonate serves to solubilize the lime in the aqueous phase to increase the dissolved calcium content therein due to the formation of calcium lignosulfonate by metathetical reaction. Also the ammonium lignosulfonate acts as a clay dispersing agent as well as the resultant calcium lignosulfonate. The two component reagent admixture may be employed in the amount in the range 3–15, usually in the range 5–10, lbs. per barrel to produce a satisfactory drilling fluid of the type described herein.

Suitable drilling fluids in accordance with the practice of this invention are also obtainable by the addition of a three component reagent admixture comprising a soluble ammonium salt, such as ammonium chloride, lime and a clay dispersing agent such as Kembreak, a calcium lignosulfonate, in an amount in the range 3–15, usually in the range 5–10 lbs. per barrel of drilling fluid, the components making up said reagent admixture being in the weight ratio 0.5–2.5:0.5–10:0.5–10, respectively.

Drilling fluids prepared in accordance with the teachings of this invention may be adjusted to a high density by the addition of weighting agents thereto without seriously changing or affecting the character of the drilling mud.

The resistance of the subject muds to gypsum contamination and salt (NaCl) resistance at least up to about 50,000 p.p.m. is satisfactory.

As will be apparent to those skilled in the art many modifications, changes and substitutions are possible without departing from the spirit or scope of this invention.

We claim:

1. A drilling fluid additive suitable for the preparation of an aqueous alkaline drilling fluid consisting essentially of ammonium chloride, lime and a clay dispersing agent in the weight range 0.5–2.5:0.5–10:0.5–10, respectively.

2. A drilling mud additive consisting essentially of a water soluble ammonium salt, lime and a clay dispersing agent in the weight range of 0.5–2.5:0.5–10:0.5–10, respectively.

3. A drilling mud additive consisting essentially of a water soluble ammonium salt, lime and calcium lignosulfonate in the weight range of 0.5–2.5:0.5–10:0.5–10, respectively.

4. A drilling mud additive consisting essentially of a water soluble ammonium salt, lime and an alkaline earth metal lignosulfonate in the weight range of 0.5–2.5:0.5–10:0.5–10, respectively.

5. A drilling mud additive consisting essentially of ammonium sulfate, lime and calcium lignosulfonate in the range of 0.5–2.5:0.5–10:0.5–10, respectively.

6. A drilling mud additive consisting essentially of ammonium sulfate, lime and ammonium lignosulfonate in the weight of 0.5–2.5:0.5–10:0.5–10, respectively.

7. In the drilling of a bore hole through a heaving shale formation wherein a drilling fluid is passed through the bore hole in contact with the heaving shale formation during the drilling operation the improvement which comprises adding lime and ammonium lignosulfonate to water, permitting the thus-added lime and ammonium lignosulfonate to undergo metathetical reaction therein with the resulting formation of calcium lignosulfonate and ammonium hydroxide to yield a resulting alkaline aqueous phase having a pH not in excess of 12.6 and a calcium ion concentration in excess of 200 parts per million by weight and contacting said formation with said resulting aqueous phase as said drilling fluid.

References Cited in the file of this patent

UNITED STATES PATENTS

| | | |
| --- | --- | --- |
| 2,491,436 | Barnes | Dec. 13, 1949 |
| 2,710,254 | Van Blaricom | June 7, 1955 |
| 2,710,255 | Van Blaricom | June 7, 1955 |
| 2,727,028 | Russell et al. | Dec. 13, 1955 |
| 2,771,420 | Rowe | Nov. 20, 1956 |
| 2,802,783 | Weiss et al. | Aug. 13, 1957 |
| 2,856,356 | Weiss et al. | Oct. 14, 1958 |

UNITED STATES PATENT OFFICE
CERTIFICATION OF CORRECTION

Patent No. 2,960,464

November 15, 1960

Walter J. Weiss et al.

It is hereby certified that error appears in the above numbered patent requiring correction and that the said Letters Patent should read as corrected below.

Column 2, line 6, for "considerably" read -- considerable --; column 6, line 38, after "the" insert -- weight --; line 41, after "weight" insert -- range --.

Signed and sealed this 25th day of April 1961.

(SEAL)
Attest:

ERNEST W. SWIDER
Attesting Officer

DAVID L. LADD
Commissioner of Patents